United States Patent
Struyve et al.

(10) Patent No.: US 11,232,070 B2
(45) Date of Patent: Jan. 25, 2022

(54) METADATA COMPACTION IN A DISTRIBUTED STORAGE SYSTEM

(71) Applicant: Western Digital Technologies, Inc., San Jose, CA (US)

(72) Inventors: Koen Struyve, Dentergem (BE); Thomas Demoor, De Haan (BE); Wim Vander Schelden, Ghent (BE)

(73) Assignee: Western Digital Technologies, Inc., San Jose, CA (US)

( * ) Notice: Subject to any disclaimer, the term of this patent is extended or adjusted under 35 U.S.C. 154(b) by 116 days.

(21) Appl. No.: 16/828,948

(22) Filed: Mar. 24, 2020

(65) Prior Publication Data

US 2020/0401557 A1 Dec. 24, 2020

Related U.S. Application Data

(60) Provisional application No. 62/865,649, filed on Jun. 24, 2019.

(51) Int. Cl.
| | | |
|---|---|---|
| *G06F 12/00* | (2006.01) | |
| *G06F 13/00* | (2006.01) | |
| *G06F 13/28* | (2006.01) | |
| *G06F 16/14* | (2019.01) | |
| *G06F 16/22* | (2019.01) | |
| *G06F 3/06* | (2006.01) | |

(52) U.S. Cl.
CPC ............ *G06F 16/14* (2019.01); *G06F 3/0604* (2013.01); *G06F 3/064* (2013.01); *G06F 3/0608* (2013.01); *G06F 3/0626* (2013.01); *G06F 3/0673* (2013.01); *G06F 16/2228* (2019.01)

(58) Field of Classification Search
CPC .... G06F 16/14; G06F 16/2228; G06F 3/0604; G06F 3/0608; G06F 3/0626; G06F 3/064
USPC ......................................................... 711/165
See application file for complete search history.

(56) References Cited

U.S. PATENT DOCUMENTS

| | | | |
|---|---|---|---|
| 9,135,136 | B2 | 9/2015 | De Schrijver et al. |
| 9,563,555 | B2 | 2/2017 | Flynn et al. |
| 9,588,862 | B2 | 3/2017 | De Keyser et al. |
| 10,078,552 | B2 | 9/2018 | De Keyser et al. |
| 2002/0124137 | A1 | 9/2002 | Ulrich et al. |
| 2008/0077762 | A1 | 3/2008 | Scott et al. |
| 2010/0047451 | A1 | 2/2010 | Miura |
| 2010/0094803 | A1* | 4/2010 | Yamakawa ........... G06F 16/907 707/609 |
| 2013/0254509 | A1 | 9/2013 | Patil et al. |
| 2014/0052953 | A1* | 2/2014 | Ben-Tsion ............ G06F 3/0605 711/172 |

(Continued)

FOREIGN PATENT DOCUMENTS

EP 1128254 A2 8/2001

*Primary Examiner* — Edward J Dudek, Jr.
*Assistant Examiner* — Sidney Li
(74) *Attorney, Agent, or Firm* — Patent Law Works LLP

(57) ABSTRACT

Systems and methods for metadata compaction in a distributed storage system with a file system interface are described. A file system interface and an object storage system interface use a metadata index for mapping object identifiers from the object storage system to location identifiers for the file system. When the metadata index includes a number of entries for continuous data blocks with overlapping intervals, a defragmentation operation may generate a defragmented entry for a defragmentation interval overlapping the overlapping data blocks.

20 Claims, 7 Drawing Sheets

(56) References Cited

U.S. PATENT DOCUMENTS

| | | |
|---|---|---|
| 2014/0250282 A1 | 9/2014 | Yamamoto |
| 2015/0220551 A1 | 8/2015 | Duzly et al. |
| 2016/0350007 A1* | 12/2016 | Choi .................... G06F 3/0683 |
| 2017/0160963 A1 | 6/2017 | Frank et al. |
| 2018/0107593 A1 | 4/2018 | Ogawa |

* cited by examiner

US 11,232,070 B2

METADATA COMPACTION IN A DISTRIBUTED STORAGE SYSTEM

TECHNICAL FIELD

The present disclosure generally relates to data storage, and in a more particular example, to defragmentation of metadata in data storage systems.

BACKGROUND

Often, distributed storage systems (DSS) are used to store large amounts (i.e., terabytes, petabytes, exabytes, etc.) of data, such as objects or files in a distributed and fault tolerant manner with a predetermined level of redundancy.

Some existing object storage systems store data objects referenced by an object identifier versus file systems. This can generally allow object storage systems to surpass the maximum limits for storage capacity of file systems in a flexible way such that, for example, storage capacity can be added or removed as a function of the applications, systems, and/or enterprise needs, while reducing degradation in performance as the system grows. As a result, object storage systems are often selected for large-scale storage systems.

These large-scale storage systems may need to interface with a variety of systems, platforms, and applications, some of which may not include native support for object storage. As such, file system interfaces have been developed to enable systems based on alternate storage protocols, such as network file system (NFS) protocol, to benefit from storing data in a back-end large-scale storage system. In addition to object storage systems, other distributed storage systems may use storage paradigms that do not directly map to the file systems of client systems and may utilize some level of metadata and indirection to map (i.e., metadata index) between file data and backend storage data.

Large-scale storage systems generally distribute the stored data over multiple storage elements, such as for example solid-state drives, or multiple components such as storage nodes comprising a plurality of such storage elements. However, as the number of storage elements in such a distributed storage system increase, the probability of failure of one or more of these storage elements increases, as does the probability of failure or interruption of controller, network, and interface components. To cope with these issue, distributed storage systems generally use some level of redundancy at the data, storage node, controller, interface, client, and network levels.

When accessing a large-scale distributed storage system with a file system interface on a client side and storage (backend) interface on a storage side, fragmentation may reduce read performance and increase metadata size. Furthermore, defragmentation for a file system interface of a large-scale distributed storage systems typically is a complex maintenance operation which is resource intensive.

In some configurations, there may be an ongoing need for efficient and reliable metadata defragmentation to reduce metadata size and improve performance of various storage operations through a file interface.

SUMMARY

Various aspects for metadata compaction in distributed storage systems, particularly, generating a defragmented entry from overlapping entries in the metadata index for a file system interface are described.

One general aspect includes a system that includes: a file system interface configured to process file data requests for data from a file system client; an object storage system interface configured to process object storage requests to an object storage system; and a metadata index manager. The metadata index manager is configured to manage a metadata index and generate, responsive to a defragmentation operation, a defragmented entry in the metadata index. The metadata index includes a plurality of entries, each entry of the plurality of entries includes an object identifier for the object storage system and a file system location identifier for a block of data, and the plurality of entries includes a plurality of continuous data blocks. The defragmented entry includes a defragmentation interval traversing the plurality of continuous data blocks.

Implementations may include one or more of the following features. The system may include a compactor configured to: determine the defragmentation interval for a first determined quantity of the plurality of entries; read blocks of data for the defragmentation interval from the object storage system; and write a defragmented block of data for the defragmentation interval in the object storage system, where writing the block of data for the defragmentation interval generates the defragmented entry in the metadata index. The metadata index manager may be further configured to: add the plurality of entries in sequential order in the metadata index based on a timestamp associated with an operation associated with each entry; access entries in the metadata index in reverse chronological order for new data operations; and add the defragmented entry following the plurality of entries for the plurality of continuous data blocks. The file system location identifier for each entry of the plurality of entries may define: a block start location, a block end location, and a block length for an interval of the block of data. A new file system location identifier for the defragmented entry may identify the defragmented block of data spanning the defragmentation interval, define a defragmented block start location equal to an earliest block start location among the plurality of continuous data blocks, and defines a defragmented block end location equal to a latest block end location among the plurality of continuous data blocks. The compactor may be further configured to remove entries in the plurality of entries preceding the defragmented entry that include a block of data within the defragmentation interval. The system may include a defragmentation initiator configured to: determine an operation type for a storage operation; and initiate, responsive to the operation type being a write operation, the defragmentation operation, where the compactor includes a write block for the write operation in the defragmentation interval. The system may include a defragmentation initiator configured to: determine an operation type for a storage operation; and initiate, responsive to the operation type being a read operation, the defragmentation operation, where the compactor includes a read interval for the read operation in the defragmentation interval. The read interval may be the defragmentation interval. The system may include a defragmentation initiator configured to: determine a fragmentation value for the metadata index based on a relationship between a file size value for the file system client and an object size value for the object storage system; determine a fragmentation threshold based on a performance impact value for the object storage system; and initiate, responsive to the fragmentation value meeting the fragmentation threshold, the defragmentation operation. The system may include a defragmentation initiator configured to: receive a maintenance operation request for the defragmentation operation; and initiate, responsive to receiving the maintenance operation request, the defragmentation operation.

Another general aspect includes a computer-implemented method that may include: processing, through a file system interface, file data requests for data from a file system client; processing, through an object storage system interface, object storage requests to an object storage system; and managing a metadata index; and generating, responsive to a defragmentation operation, a defragmented entry in the metadata index. The metadata index includes a plurality of entries, each entry of the plurality of entries includes an object identifier for the object storage system and a file system location identifier for a block of data, and the plurality of entries includes a plurality of continuous data blocks with continuous intervals. The defragmented entry includes a defragmentation interval traversing the plurality of continuous data blocks.

Implementations may include one or more of the following features. The computer-implemented method may include: determining the defragmentation interval for a first determined quantity of the plurality of entries; reading blocks of data for the defragmentation interval from the object storage system; and writing a defragmented block of data for the defragmentation interval in the object storage system, where writing the defragmented block of data for the defragmentation interval generates the defragmented entry in the metadata index. Managing the metadata index may include: adding the plurality of entries in sequential order in the metadata index based on a timestamp associated with an operation associated with each entry; accessing entries in the metadata index in reverse chronological order for new data operations; and adding the defragmented entry following the plurality of entries for the plurality of continuous data blocks. The file system location identifier for each entry of the plurality of entries may define: a block start location; a block end location; and a block length for an interval of the block of data. A new file system location identifier for the defragmented entry may: identify the defragmented block of data spanning the defragmentation interval; define a defragmented block start location equal to an earliest block start location among the plurality of continuous data blocks; and define a defragmented block end location equal to a latest block end location among the plurality of continuous data blocks. The computer-implemented method may include removing entries in the plurality of entries preceding the defragmented entry that include a block of data within the defragmentation interval. The computer-implemented method may include: determining an operation type for a storage operation; and initiating, responsive to the operation type being a write operation, the defragmentation operation, where a write block for the write operation is in the defragmentation interval. The computer-implemented method may include: determining an operation type for a storage operation; and initiating, responsive to the operation type being a read operation, the defragmentation operation, where a read interval for the read operation is in the defragmentation interval. The computer-implemented method may include: determining a fragmentation value for the metadata index based on a relationship between a file size value for the file system client and an object size value for the object storage system; determining a fragmentation threshold based on a performance impact value for the object storage system; and initiating, responsive to the fragmentation value meeting the fragmentation threshold, the defragmentation operation. The computer-implemented method may include: receiving a maintenance operation request for the defragmentation operation; and initiating, responsive to receiving the maintenance operation request, the defragmentation operation.

Another general aspect may include a system that includes: means for processing, through a file system interface, file data requests for data from a file system client; means for processing, through an object storage system interface, object storage requests to an object storage system; means for managing a metadata index; and means for generating, responsive to a defragmentation operation, a defragmented entry in the metadata index. The metadata index includes a plurality of entries, each entry of the plurality of entries includes an object identifier for the object storage system and a file system interface location identifier for a block of data, and the plurality of entries includes a plurality of continuous data blocks with continuous intervals. The defragmented entry includes a defragmentation interval traversing the plurality of continuous data blocks.

The various embodiments advantageously apply the teachings of data storage systems to improve the functionality of such computer systems. The various embodiments include operations and data structures to overcome or at least reduce issues in the previous storage systems discussed above and, accordingly, are more reliable, efficient, and scalable than other computer data storage architectures for some applications. That is, the various embodiments disclosed herein include hardware and/or software with functionality to improve the efficiency and scalability of a metadata index for file system interfaces by selectively defragmenting overlapping entries. Accordingly, the embodiments disclosed herein provide various improvements to storage systems.

It should be understood, however, that the above list of features is not all-inclusive and many additional features and advantages, such as but not limited to those discussed below, are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Figure 1:
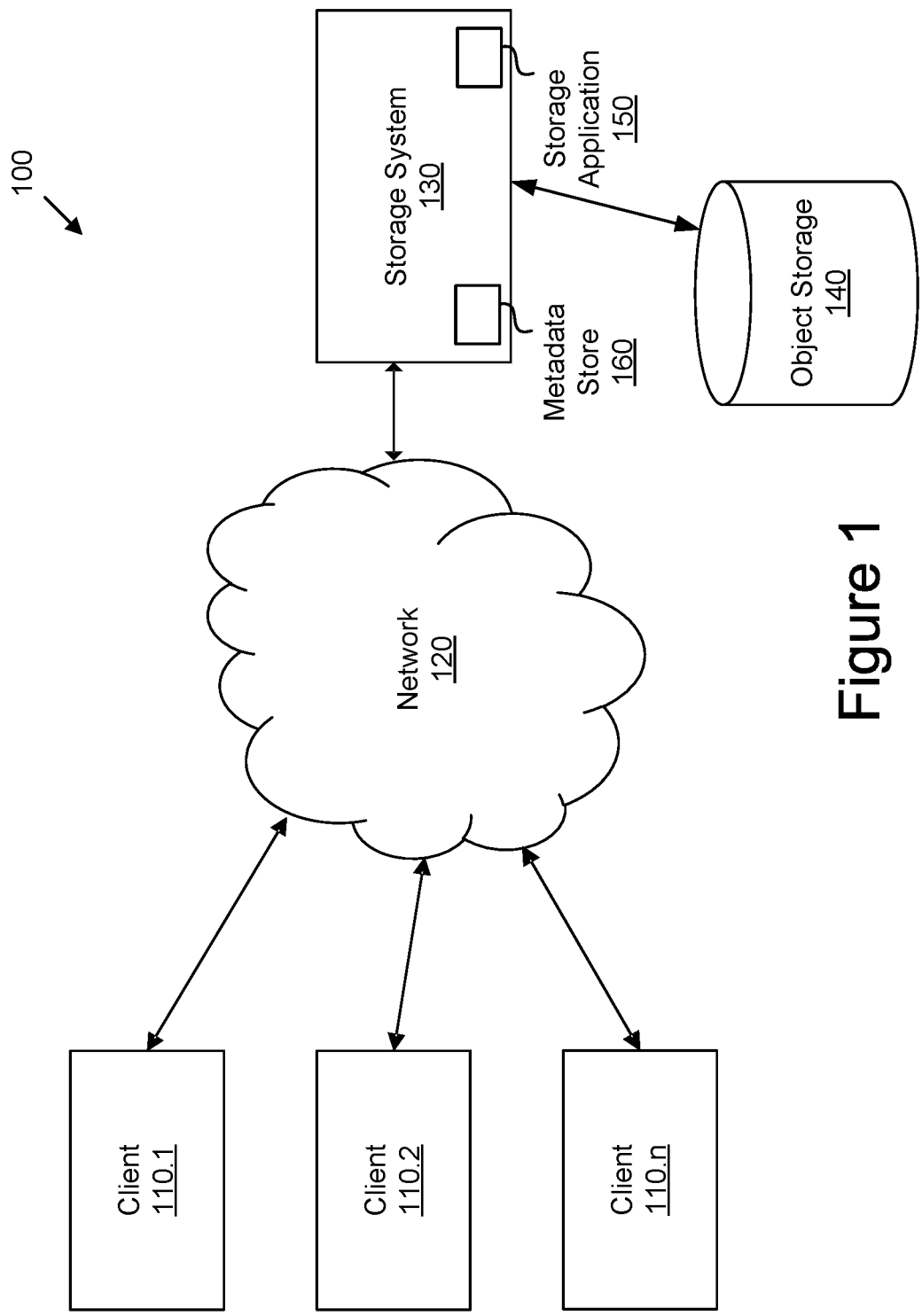
FIG. 1 is a block diagram an example distributed storage system.

FIG. 1 shows an embodiment of an example distributed storage system 100. The distributed storage system 100 may be implemented as a distributed object storage system which is coupled to one or more clients 110.1-110.*n* for accessing data objects. The connection between the distributed storage system 100 and clients 110 could, for example, be implemented as a suitable data communication network 120. Clients 110 may host or interface with one or more applications that use data stored in distributed storage system 100. Such an application could, for example, be a dedicated software application running on a client computing device, such as a personal computer, a laptop, a wireless telephone, a personal digital assistant, or any other type of communication device that is able to interface directly with the distributed storage system 100. However, according to alternative embodiments, the applications could, for example, comprise a suitable file system which enables a general-purpose software application to interface with the distributed storage system 100, an application programming interface (API) library for the distributed storage system 100, etc.

A client 110 can be any computing hardware and/or software (e.g., a thick client, a thin client, or hybrid thereof) capable of accessing storage system 130 utilizing network 120. Each client 110, as part of its respective operation, relies on sending input/output (I/O) requests to storage system 130 to write data, read data, and/or modify data. Specifically, each client 110 can transmit I/O requests to read, write, store, communicate, propagate, and/or transport instructions, data, computer programs, software, code, routines, etc., to storage system 130. Client 110 and storage system 130 may comprise at least a portion of a client-server model. In general, storage system 130 can be accessed by client 110 and/or communication with storage system 130 can be initiated by client 110 through a network socket (not shown) utilizing one or more inter-process networking techniques. In some embodiments, client 110 may access one or more applications to use or manage a distributed storage system, such as distributed storage system 100. In some embodiments, clients 110 may be configured to use file systems for data storage and storage requests to storage system 130 may follow file system protocols and formatting.

In some embodiments, storage system 130 may include a file system interface for object storage 140. Storage system 130 may include a storage application 150 and metadata store 160 for receiving file system storage operations and processing them to store, retrieve, and manage backend data as data objects in object storage 140. Metadata store 160 may include a metadata index for mapping file storage locations to object identifiers for data objects containing the file data blocks.

Figure 2:
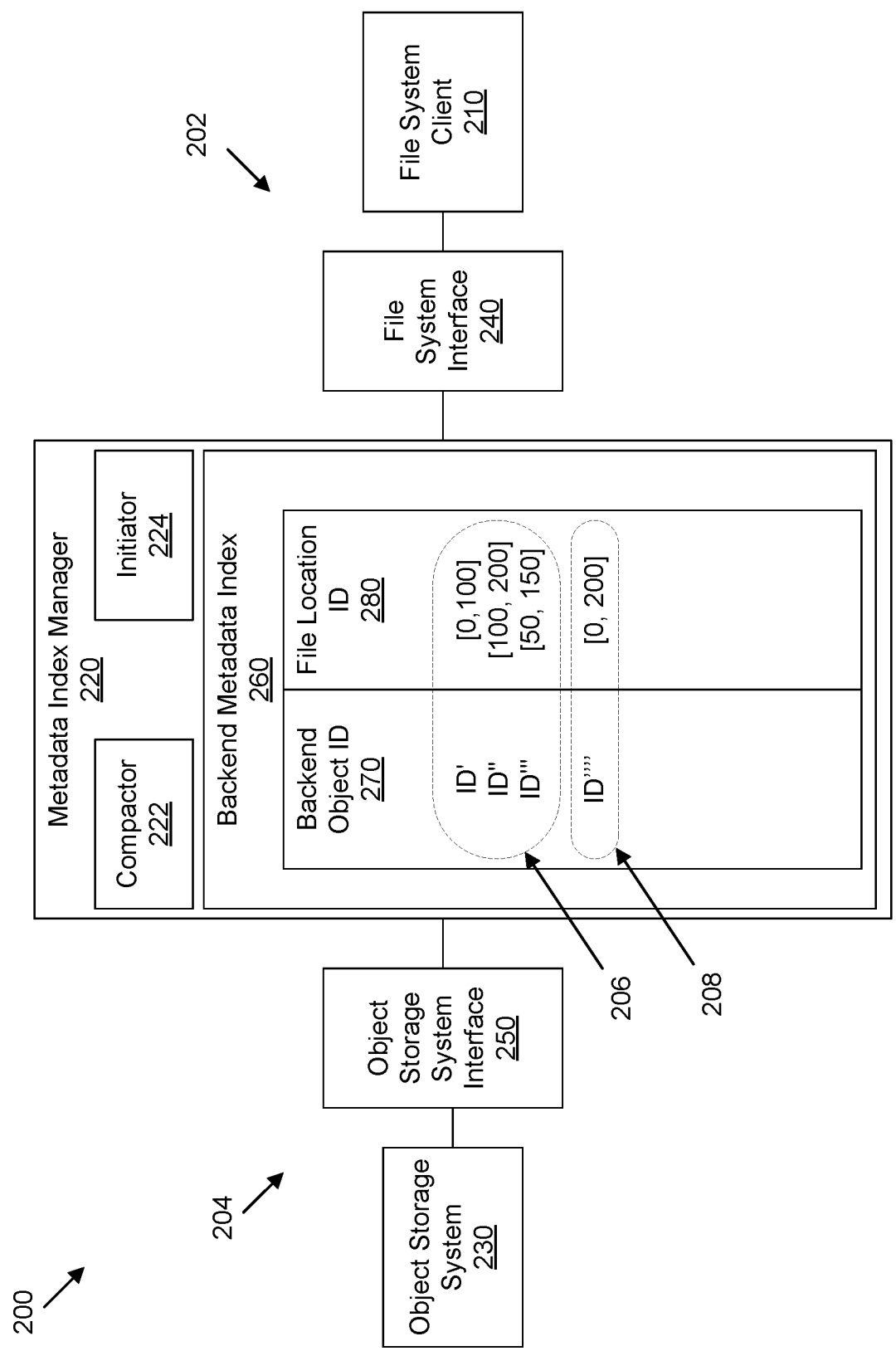
FIG. 2 is a block diagram of a storage management system.

FIG. 2 illustrates a block diagram of a storage management system 200. In some embodiments, it may operate within the distributed storage system 100 of FIG. 1. As stated, when accessing a large-scale distributed storage system with a file system interface 240 on top of a subsequent object storage system interface 250, fragmentation may occur and cause a reduction in the read performance and an increase in metadata size in the backend metadata index 260. Metadata index manager 220 may be configured to efficiently execute a defragmentation operation using backend metadata index 260 to reduce the number of metadata entries.

In some embodiments, a defragmentation operation uses a compactor 222 to perform defragmentation and compaction operations. Storage management system 200 may include a client side 202 and a storage side 204. Client side 202 may include a file system client 210 and a files system interface 240 that receives storage requests from the file system client 210 using a file system protocol. Storage side 204 may include object storage system 230 and an object storage system interface 250 that sends storage requests to the object storage system using an object storage protocol. Generally, data may be stored and retrieved between file system client 210 and object storage system 230 using backend metadata index 260 to map file system location identifiers 280 to backend object identifiers 270. File system client 210 utilizes file system interface 240 for requesting and receiving data and object storage system 230 utilizes object storage system interface 250 for requesting and receiving data.

File system interface 240 may be configured to process file data requests for data from a file system client 210. For example, the file data requests for data may include read (i.e., GET) operations or write (i.e., PUT) operations and refer to one or more file location identifiers. File system interface 240 may be configured according to a predetermined file system storage protocol, such as network file system (NFS), common internet file system (CIFS), server message block (SMB), etc.

Object storage system interface 250 may be configured to process object storage requests with object storage system 230. For example, object storage requests may include read (i.e., GET) operations or write (i.e., PUT) operations and refer to one or more unique object identifiers, such as global unique identifiers (GUID).

Metadata index manager 220 may provide mapping between file system interface 240 and object storage system interface 250. Metadata index manager 220 may be configured to manage backend metadata index 260 for access, entry generation, removal, and defragmentation. In some embodiments, a defragmentation process for metadata index 260 may be managed using a compactor 222 and an initiator 224. Backend metadata index 260 may include a plurality of entries 206, each including a file system location identifier 280 specifying a block of data of an interval (i.e., [start location, length]) referenced to the file system interface 240. Each file system location identifier 280 may be linked to a backend object identifier 270 which specifies an object data location of the data referenced to the object storage system interface 250. For example, metadata index 260 may be structured as a lookup table or key value store that associates a file system location identifier 280 and a backend object identifier 270 in each entry.

Metadata index manager 220 may include compactor 222 configured to defragment the plurality of entries 206 and generate a corresponding defragmented entry 208, the operation of which is further described below. Compactor 222 may include logic, functions, parameters, and data structures to: (1) determine a defragmentation interval which spans a first determined quantity of the plurality of entries 206 including data blocks each of a second determined size; (2) read the data for the defragmentation interval from the object storage system 230; (3) write the data for the defragmentation interval in the object storage system 230; (4) add a new entry 208 to an end of the plurality of entries 206 in the backend metadata index 260, the new entry 208 including a new file system interface location identifier 280 identifying a block spanning the defragmentation interval; and (5) remove ones of the plurality of entries 206 that include a block of data included within the defragmentation interval (in the example shown, all of the plurality of entries 206 would be removed).

Metadata index manager 220 may include an initiator 224 (or defragmentation initiator) for compactor 222, configured to determine when the defragmentation process should be initiated and for what target entries and defragmentation intervals. Initiator 224 may use both a fragmentation threshold to determine whether defragmentation operations should be enabled and one or more operational triggers determining when and what entries should be targeted for defragmentation. Example operational triggers may include write operations, read operations, and maintenance operations (background or foreground).

For example, compactor 222 may perform the above defragmentation and compaction operations during a write operation by the file system interface 240. Initiator 224 may detect the write operation and use the write interval of the file system write location to seed a defragmentation interval that includes the write location. For example, the write location may be determined to be terminal for the start or end of the defragmentation interval or compactor 222 may be configured to use a moving window of the defragmentation interval to select an interval that includes the write block and maximizes the prior entries compacted.

For another example, compactor 222 may perform the above defragmentation and compaction operations during a read operation by the file system interface 240 for the data in a read interval. Initiator 224 may detect the read operation and use the read interval of the file system read location to seed a defragmentation interval that includes the read location. For example, the read location may be determined to be terminal for the start or end of the defragmentation interval or compactor 222 may be configured to use a moving window of the defragmentation interval to select an interval that includes the read block and maximizes the prior entries compacted. In some embodiments, the read interval may be the defragmentation interval and the compactor 222 may be further configured to: (1) write the data for the defragmentation interval in the object storage system 230; (2) add a new entry 208 to an end of the plurality of entries 206 in the backend metadata index, the new entry including a new file system interface location identifier 280 identifying a block spanning the defragmentation interval; and (3) remove ones of the plurality of entries 206 that include a block of data included within the defragmentation interval.

For another example, compactor 222 may perform the above defragmentation and compaction operations during a maintenance operation, such as a background of foreground maintenance operation. In some embodiments, initiator 224 may receive a defragmentation operation request from a background task or maintenance task scheduler or interface. For example, a maintenance task scheduler may monitor processing and storage resources to initiate or schedule maintenance tasks for the storage system and defragmentation operations may be included among the maintenance tasks managed. In some embodiments, initiator 224 may maintain a schedule for defragmentation operations and/or monitor one or more resource values to determine when the defragmentation operation may be initiated as a maintenance operation independent of processing storage requests.

Blocks of data may be stored and retrieved between a file system client 210 and an object storage system 230 configured as a large-scale distributed storage system (DSS). The data blocks may be stored at a particular location in the object storage system 230, with the location identified to the files system interface 240 as a file system interface location identifier 280, and the location identified to the object storage system interface 250 as a backend object identifier 270. Backend metadata index 260 links the file system interface location identifier 280 with the backend object identifier 270, which is then used by the object storage system interface 250 to retrieve the data from the object storage system 230. Also, position metadata for each backend object identifier 270 could, for example, also comprise a length information. Schematically this could, for example, be represented as:
-id→(position 1, len 100)
-id'→(position 100, len 100)
- . . .

Backend metadata index 260 could, for example, comprise a sequential list with such metadata entries, which could for example be represented as:
{(id [0,100]), (id' [100,200]), . . . }
in which [0,100] comprises the interval of locations of the file system interface linked to backend object identifier "id" for retrieval of this data through the object storage system interface of the backend DSS, such as for example an object storage system interface 250.

When, for example, a part of a file at location 50-150 based on the file system interface location (i.e., interval of locations) is subsequently overwritten, backend metadata index 260 could, for example, add a new entry (i.e., a new file system interface location identifier) resulting in the sequential list:
{(id [0,100]), (id' [100,200]), (id" [50, 150]), . . . }.

When a file system client 210 using the file system interface subsequently wants to retrieve data, for example, from location 100-116 of the file system interface location (i.e., interval of locations), then the list above may be traversed in reverse order and the first metadata entry that covers the file system interface location (i.e., interval of locations) identifier 280 to be retrieved will provide the correct backend object identifier 270 to be used to retrieve the backend data from object storage system 230.

In the above example, the first metadata entry 206 that matches the file system interface location "100-116" in reverse order will be a location "[50, 150]" and the metadata index manager 20 will thus return the identifier id" for retrieval of the backend data.

As described above, when, for example, a large quantity of small data pieces are written through the file system interface 240, or in other words, when the number of blocks is much, much greater than (i.e., >>) the file size, then fragmentation results in which the backend metadata (i.e., entries 206) will grow rapidly causing performance degradation.

Figure 3:
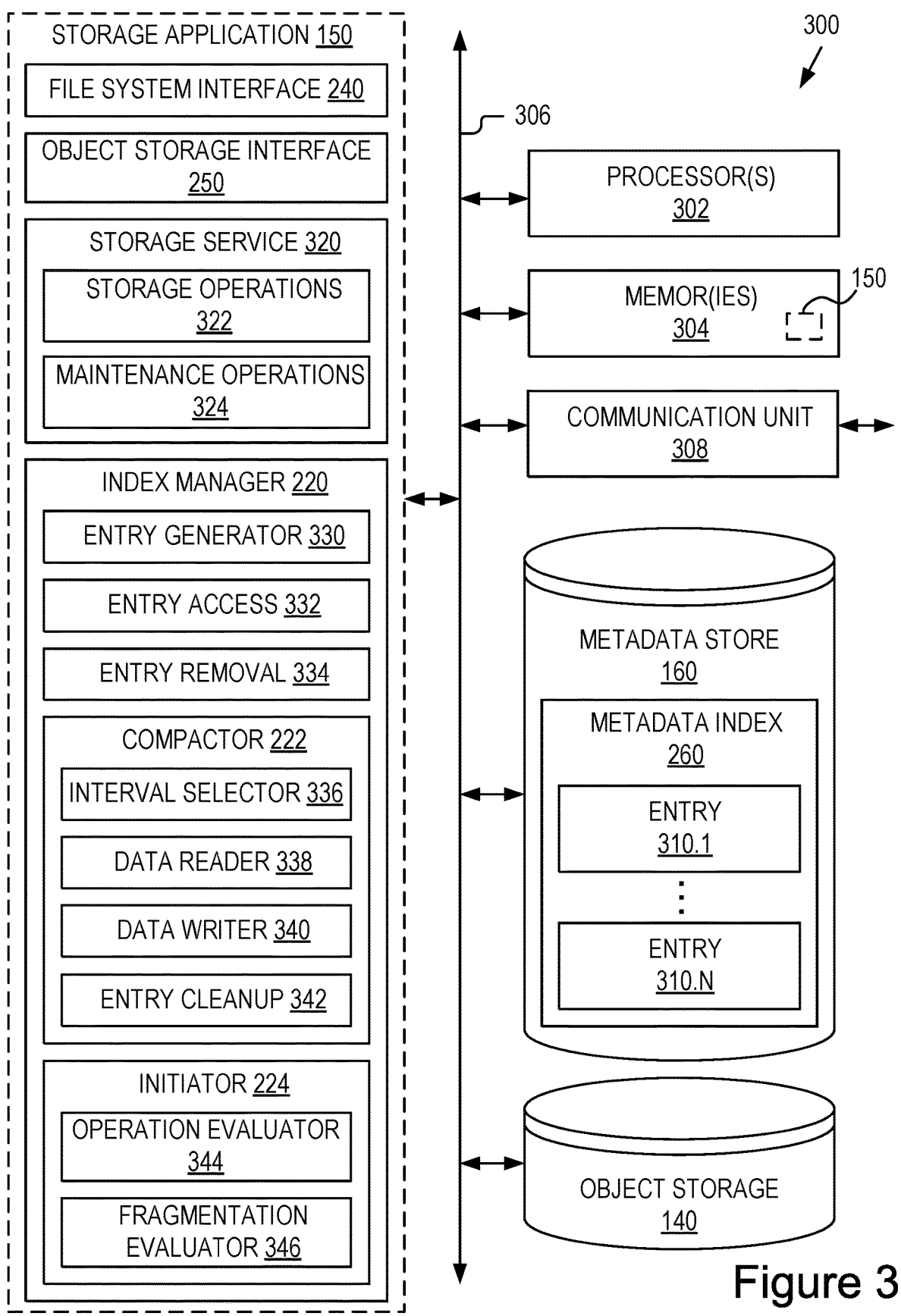
FIG. 3 is a block diagram of an example computing system.

FIG. 3 is a block diagram of an example computing system 300. In some embodiments, computing system 300 may represent a server instance or collection of instances, such as storage system 130. In some embodiments, computing system 300 may reflect other computing systems, such as client devices, interface nodes, controller nodes, storage nodes, etc. Computing system 300 may comprise and/or be coupled to one or more processors 302, one or more memories 304, one or more communication units 308, a metadata store 160, and an object storage 140. Computing system 300 further includes an instance of storage application 150. The components of computing system 300 can be communicatively coupled by a bus 306. In some embodiments, metadata store 160 and/or object storage 140 may be implemented in a separate computing system and may be coupled to computing system 300 via communication unit 308. In some embodiments, storage application 150, or aspects thereof, may be implemented in the separate computing system (e.g., as a distributed or local application, etc.)

As shown in FIG. 3, storage application 150 includes file system interface 240, object storage interface 250, storage service 320, and index manager 220, although it should be understood that the depicted storage application 150 architecture is provided by way of illustration, and that storage application 150 may include other components and/or include other component hierarchies, and/or that the foregoing components and/or their acts and/or functionality may be combined or segmented into further components, etc.

Storage application 150, and/or its sub-components, such as, but not limited to, file system interface 240, object storage interface 250, storage service 320, and index manager 220 may be implemented in hardware and/or software. For instance, storage application 150, and/or one or more of its sub-components, may include hardware and/or software logic executable by the computing system 300. In some embodiments, storage application 150, and/or one or more of its sub-components, may comprise sets of instructions executable by processor(s) 302 to provide their functionality. In some embodiments, storage application 150, and/or one or more of its sub-components, are stored in memor(ies) 304 of computing system 300 and are accessible and executable by processor(s) 302 to provide their functionality. In any of the foregoing implementations, storage application 150, and/or one or more of its sub-components, may be adapted for cooperation and communication with processor(s) 302 and other components of computing system 300.

In further implementations, storage application 150, and/or one or more of its sub-components, may include specially configured software stored in memor(ies) 304 and executable by processor(s) 302 so as to configure processor(s) 302. In some embodiments, storage application 150, and/or one or more of its sub-components, may include logic gates, switches, application specific integrated circuitry (ASIC), a programmable logic controller, an embedded microcontroller, and/or other suitable hardware, etc. In further embodiments, storage application 150, and/or one or more of its sub-components, may include both hardware and software aspects. Numerous further variations are also possible and contemplated.

It should be appreciated that computing system 300 may represent a single computing system, a plurality of computing systems connected over a wide geographic area, a server cluster, or other suitable computing configurations. Thus, while the structure, acts, and functionality of computing system 300 may be described in the singular for clarity, it should be understood that the description is applicable to and includes more simple or complex computing infrastructure.

File system interface 240 may comprise logic executable to receive and respond to file storage requests from file system clients. For example, file system interface 240 may be configured as a file server for file system clients. The file server may receive file data requests from one or more file system clients. These file data requests may be include file data elements of a defined size, such as 4K, 512K, 1 MB, or other file block sizes (or block lengths) and these file size may not correlate to the preferred object sizes of object storage 140. File system interface 240 may include a variety of configurations for allocating cache storage, aggregating file data requests, determining when a storage operation is triggered, and acknowledging file data operations back to the client systems. In some embodiments, file system interface 240 may include a client request handler, a file system protocol, a client response handler, and other functions for managing file storage requests from file system clients. File system interface 240 may include additional functions for other data access features, such as cache management, duplicate request handling, request prioritization, metadata management, etc.

Object storage interface 250 may comprise logic executable to send object storage requests to and receive responses from object storage 140. Object storage interface 250 may include an interface protocol or set of functions and parameters for storing, reading, and otherwise managing object data requests to associated object storage 140 and metadata store for mapping file data to persistent data objects. For example, object storage interface 250 may include functions for reading, writing, modifying, or otherwise manipulating data objects and their respective file data and metadata in accordance with the protocols of object storage 140. Object storage interface 250 may generate data requests translated and mapped from file data storage requests and file location identifiers by storage service 320 using metadata store 160. Object storage interface 250 may include a storage protocol, an object storage operation handler, an object identifier service for providing the object identifiers of newly created objects, and other functions for managing object storage to object storage 140 for storage application 150. In some embodiments, object storage interface 250 may be configured to provide object identifiers to storage service 320 and/or index manager 220 in response to the processing of object data requests by object storage 140.

Storage service 320 comprises computer logic executable to process file storage requests received through file system interface 240 and execute corresponding object storage requests through object storage interface 250. Storage service 320 may use file system interface 240 to receive requests from client applications. Storage service 320 may process the requests received through file system interface 240 and object storage interface 250 and transmit corresponding responses, which may include confirmation data confirming a successful execution of a storage operation, response data reflect results of a read-based request, and/or error information reflecting any errors that were encountered, etc., through file system interface 240 and object storage interface 250. In further embodiments, the functionality of storage service 320 may be included in file system interface 240 and/or object storage interface 250. Storage service 320 may be configured to process storage operations 322 for supporting file storage requests from a file system client and maintenance operations 324 related to storage application 150, metadata store 160, and, in some configurations, object storage 140.

In some embodiments, storage service 320 may include a file request handler that receives and parses file storage requests from client applications, such as a client application operating on various client devices, server systems, etc. As discussed elsewhere herein, the request may include any data necessary for executing the request, such as a storage operation type (read, write, delete, etc.) and a target file location identifier.

Storage service 320 may include conversion logic for storage operations 322 to translate file storage requests to corresponding object storage requests. Storage operations 322 may use metadata index 260 to map file location identifiers to corresponding data objects including the file data blocks for read operations and may record correspond data object identifiers for write operations. Storage operations 322 may generate object storage requests based on the conversion logic. For write operations, the resulting object identifier may be used to generate a new object key entry in metadata index 260.

Storage service 320 may include maintenance operations 324 to execute background or foreground maintenance operations on metadata store 160. For example, maintenance operations may include management of garbage collection, defragmentation, and other operations targeting metadata store 160. In some embodiments, maintenance operations 324 may generate a defragmentation operation request directed to initiator 224 of index manager 220 for initiating defragmentation of metadata store 160. For example, maintenance operations 324 may maintain a maintenance schedule, resource-based conditions for enabling maintenance operations, and/or an administrative interface for receiving maintenance requests from an administrative user or other system service. In some embodiments, maintenance operations 324 may also include parameters for determining whether any given maintenance operation is enabled or disabled. For example, enabling and disabling metadata defragmentation may be a configurable parameter. In some embodiments, an interface for enabling metadata defragmentation may also determine other parameters for selectively enabling defragmentation operations, such as storage operation triggers, resource availability triggers, and/or fragmentation threshold triggers.

Index manager 220 comprises logic executable to manage the metadata store 160. For instance, index manager 220 maintains the integrity of the ordered set of metadata index entries 310, generates new entries based on object identifiers and file location identifiers from storage service 320, stores new entries, accesses existing entries, executed defragmentation operations, manages concurrency, etc.

Index manager 220 can maintain the entries 310 stored in the metadata store 160 as an ordered set of object key entries. Using the ordered set of object key entries, prior key data entries and subsequent key data entries may be identified. Additionally, entries may be traversed in reverse order to identify the most recent write interval containing file data of interest, using file location identifiers associated with each object key entry. In some example embodiments, keys may comprise alphanumeric character strings that include letters, numbers, and/or symbols (character symbols, punctuation, mathematical symbols, etc.), in which case the ordered set of object key entries may be sorted alphanumerically.

Index manager 220 may store entries 310 in the metadata store 160 as a metadata index 260 reflecting write operations performed to objects in object storage 140. As described above, each entry may include a file location ID that refers to a file data start position and data length or interval. Entries may be stored responsive to object storage requests received by the storage service 320, such as but not limited to, put, get, delete, list, etc. Storage service 320 may be coupled to index manager 220 to instruct the index manager 220 to record the data storage operations in metadata index 260. For example, in a software embodiment, storage service 320 can call corresponding methods of index manager 220 configured to perform the various functions and acts described herein. An instruction received from storage service 320 may comprise an entry access request (such as for a read operation) or a new entry request that includes components for generating the entry, such as a new object identifier and a file location identifier.

The new entry may be situated first (relative to other existing entries) in the ordered set of object key entries since it is the most recent. However, as further operations are performed, as discussed elsewhere herein, corresponding further entries are added to metadata index 260 and the foregoing new entry becomes less recent. This advantageously allows for scalable and flexible versioning of file data stored in data objects.

Index manager 220 may include a plurality of modules configured to execute one or more functions and/or comprising interfaces, parameters, and/or data structures embodying various aspects of the logical operations of index manager 220. In some embodiments, index manager 220 may include entry generator 330, entry access 332, entry removal 334, compactor 222, and initiator 224.

Entry generator 330 may include logic, functions, parameters, interfaces, and/or data structures configured to generate new metadata index entries, such as entries 310.1-310.N, in metadata index 260. For example, entry generator 330 may respond to a write storage operation executed by storage service 320. Entry generator 330 may receive an object identifier and a file location identifier (e.g. start location and interval) for the write operation. Entry generator 330 may use the object identifier and file location identifier to format a metadata index entry and add the new entry in sequential order to metadata index 260. In some embodiments, compactor 222 may use entry generator 330 for generating a defragmentation entry in response to a defragmentation operation. Entry generator 330 may be configured to place the defragmentation entry following the last prior entry that is being replaced by the defragmentation entry.

Entry access 332 may include logic, functions, parameters, interfaces, and/or data structures configured to access metadata index entries 310 for supporting storage service 320. For example, entry access 332 may respond to a read storage operation to be executed by storage service 320. Entry access 332 may traverse metadata index 260 in reverse chronological order to determine the most recent entry or entries containing data blocks in the read interval of the read request. In some embodiments, entry access 330 may return the object identifiers corresponding to the data objects containing the file data blocks needed for the read request. For example, the read interval may traverse a plurality of data objects. In some embodiments, compactor 222 may use entry access 332 for identifying data entries in a defragmentation interval.

Entry removal 334 may include logic, functions, parameters, interfaces, and/or data structures configured to remove selected entries 310 from metadata index 160. For example, entry removal 334 may respond to maintenance operations 324 and/or compactor 222 to selectively remove entries from metadata index 260 that are no longer needed. Entry removal 334 may be configured to receive an object identifier, object key, or other key value, query or traverse metadata index 260 to determine the location of the target entry or entries, and delete the target entry or entries. In some embodiments, compactor 222 may use entry removal 334 to remove the prior entries that are contained in the defragmentation interval and may therefore be obviated by the addition of the defragmentation entry.

Compactor 222 may include logic, functions, parameters, interfaces, and/or data structures configured to replace a plurality of entries 310 with overlapping data blocks with a combined defragmented entry that corresponds to the most recent versions of all data blocks in the defragmentation interval. For example, compactor 222 may identify a plurality of entries that cover a continuous interval of file data blocks based on their file location identifiers, read the corresponding file data blocks from object storage 140, write the data blocks back to a single data object in object storage 140 to generate a single entry for the continuous defragmentation interval, and delete the original entries in the continuous interval, compacting the plurality of overlapping entries into a single defragmented entry. In some embodiments, compactor 222 may include interval selector 336, data reader 338, data writer 340, and entry cleanup 342.

Interval selector 336 may include logic configured to determine an interval length for the defragmentation interval and all prior entries including file data blocks in the defragmentation interval. For example, interval selector 336 may include a predetermined interval length for defragmentation intervals that meets a preferred data object size for object storage 140. In some embodiments, the predetermined interval length may be a minimum interval length and larger interval lengths may be acceptable if terminal file data blocks at either end of the predetermined interval length extend beyond the predetermined interval length. In some embodiments, the predetermined interval length may include a plurality of incremental lengths, such as 2K, 4K, 8K, etc., configured to efficiently use object storage resources, such as cache or buffer sizes, queue depths, replication engines, etc. Interval selector 336 may select the smallest incremental length that captures an identified continuous interval of file data blocks for defragmentation.

In some embodiments, the logic for selecting interval length and the logic for selecting the target set of entries containing continuous data blocks may be iterative and include selecting a terminal data block, checking the cumulative length of all selected data blocks against the target predetermined defragmentation interval length, and determining whether to include the data block (equal to or less than the desired interval length), exclude the data block (terminate the interval with the prior terminal data block), or extend the defragmentation interval (increase the interval length to accommodate the data block).

In some embodiments, selection of the interval may be based on an operation that triggers the defragmentation. For example, a storage operation, such as a read operation or write operation, may trigger a defragmentation operation that includes the target read block or write block in the defragmentation interval. In some embodiments, the read block may be used as the defragmentation interval. A maintenance operation that initiates the defragmentation process may include a systematic process for identifying defragmentation intervals, such as starting at a terminal file data block or terminal metadata index entry and traversing in sequence until a defragmentation interval and set of entries to be defragmented are identified. In some embodiments, the maintenance operation may include parameters for the terminal positions (start and/or end positions) and the defragmentation interval to be used.

Data reader 338 and data writer 340 may include logic and an interface for initiating read and write operations through storage service 320 and/or directly through object storage interface 250. For example, data reader 338 may identify the data objects to be read from the set of entries selected by interval selector 336 and initiate a read operation through storage operations 322. Data writer 340 may concatenate the results of the file data read by data reader 338 to generate a continuous file data block for the defragmentation interval selected by interval selector 336. Data reader 338 may be configured to selectively retrieve the most recent versions of file data blocks with overlapping entries and/or data writer 340 may be configured to selectively exclude prior versions of file data blocks retrieved by data reader 338, such that entries and related data objects with overlapping file data intervals result in only a single and most recent version of any file data block in the defragmented data block.

Entry cleanup 342 may include logic for removing the prior entries that are rendered redundant by the defragmented data block and resulting entry in metadata index 260. For example, entry cleanup 342 may use the set of entries selected by interval selector 336 to delete those entries from metadata index 260. In some embodiments, entry cleanup 342 may generate a plurality of entry removal requests for the set of redundant entries and send them to entry removal 334 to remove them from metadata index 260. Entry removal 334 may remove the entries immediately upon receipt of the removal requests or may mark or queue the entries for removal through a subsequent garbage collection process for metadata store 160.

Initiator 224 may include logic, functions, parameters, interfaces, and/or data structures configured to selectively initiate compactor 222 for defragmentation operations when predefined conditions are met. For example, initiator 224 may initiate compactor 222 when both a fragmentation threshold is met for metadata index 260 based on object storage 140 and/or a portion of data objects stored therein and an operational trigger has occurred. In some embodiments, initiator 224 may include operation evaluator 344 and fragmentation evaluator 346.

Operation evaluator 344 may include logic for evaluating operations processed by storage service 320 in order to determine whether a trigger condition for compactor 222 has been met. For example, operation evaluator 344 may receive a notification from storage service 320 when specified storage operations 322 and/or maintenance operations 324 are processed or requested. In some embodiments, operation evaluator 344 may register with a notification service for specific operations and/or be integrated in an operational path for specific storage operations. For example, write operations and/or read operations may trigger an evaluation of whether the target file data block is in a fragmented segment of file data blocks and may be used to seed a defragmentation operation. In another example, read operations over a specified size threshold and/or number of metadata index entries may be used for a defragmentation operation, where the read interval is used for the defragmentation interval and the read storage operation for the client file operation acts as the read operation for data reader 338. In still another example, operation evaluator 344 may receive a defragmentation operation request from maintenance operations 324.

Fragmentation evaluator 346 may include logic for evaluating the fragmentation of metadata index 260, object storage 140, and/or data objects, buckets, partitions, or other logical divisions thereof. For example, fragmentation evaluator 346 may calculate a ratio of actual data object sizes to a preferred data object size for object storage 140. A significant percentage of data objects with an object size below the preferred data object size may represent a fragmented object store and metadata index. Fragmentation evaluator 346 may calculate or receive a fragmentation value for metadata index 260 and/or object storage 140. For example, fragmentation evaluator 346 may calculate a ratio of file size from the file system client(s) and/or file system interface 240 to the block size or object sizes supported by object storage 140. File size distributions or average file sizes below the preferred block size may result in low ratios, which equates to high levels of fragmentation. In some embodiments, fragmentation evaluator 346 may use a relationship (e.g. ratio) between a file size value for the file system client(s) and an object size value for the object storage system (e.g. object storage 140). These ratios may be represented by linear functions that directly impact one or more aspects of system efficiency and metadata size. Fragmentation values may be used to determine whether defragmentation operations should be enabled or initiated.

In some embodiments, fragmentation evaluator 346 may use one or more fragmentation values to evaluate a fragmentation threshold to determine whether defragmentation operations should be enabled or initiated. For example, fragmentation evaluator 346 may include a fragmentation threshold based on a performance impact value for the object storage system. Fragmentation evaluator 346 may compare fragmentation values to the fragmentation threshold value and initiate or enable the defragmentation operation if the fragmentation threshold is met. In some embodiments, the performance impact values may include storage space efficiency or overhead values, operational throughput values (such as storage operations per unit time), queue depths, buffer usage, and other values quantifying system efficiency that may be impacted by fragmentation of the object store and/or metadata index. For example, metadata index size per total storage used may be used as a performance impact value, since a larger metadata index requires greater space and management overhead in metadata store 160 and requires more time and/or processing resources to traverse for access operations. Fragmentation evaluator 346 may return a defragmentation trigger or enablement message to initiator 224 to initiate compactor 222 and/or enable defragmentation operations when one or more of the operational conditions are met.

Figure 4:
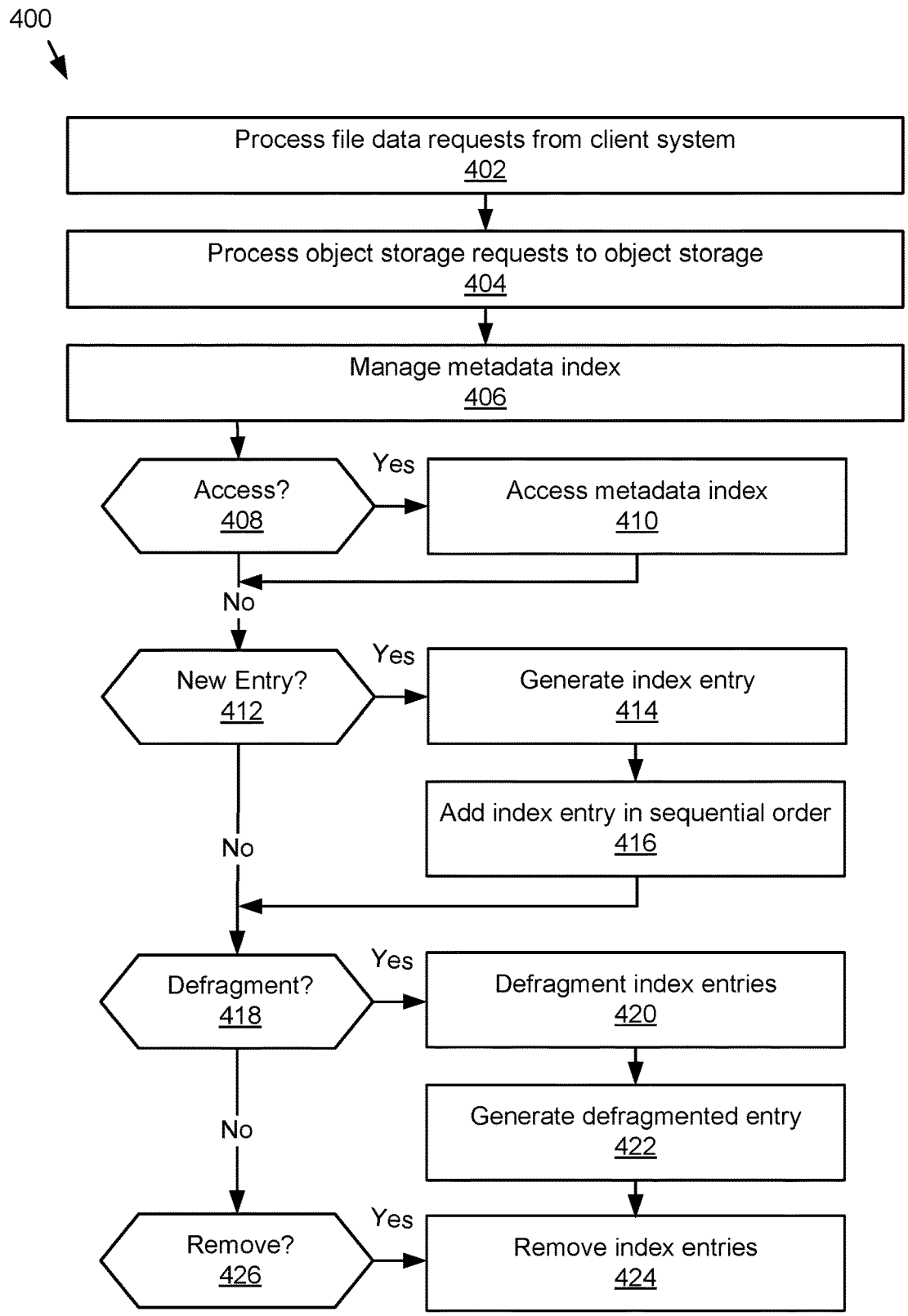
FIG. 4 is a flowchart of an example method for managing a metadata index in a storage management system.

FIG. 4 illustrates a flowchart of a method 400 for managing a metadata index in a storage management system. For example, storage application 150 may execute blocks 402-426 of method 400.

At block 402, a file data request from a client system may be processed. For example, a file system client 210 may process file data requests for file data blocks via a file system interface 240.

At block 404, an object storage request to an object storage system may be processed. For example, an object storage system interface 250 may process object storage requests to the object storage system 230.

At block 406, a metadata index may be managed to support file data requests and corresponding object storage requests. For example, a metadata index manager 220 may manage a backend metadata index 260. The backend metadata index may include a plurality of entries, with each of the entries including a file system interface location (i.e., interval of locations) identifier specifying a block of data of an interval referenced to the file system interface. The file system interface location (i.e., interval of locations) identifier 280 may be linked to a backend object identifier 270 specifying a location of the data referenced to the object storage system interface 250. Blocks 408-426 may include metadata index management operations that may be selectively triggered by metadata index manager 220.

At block 408, a metadata index access operation may be triggered. If the operation requires metadata index access, method 400 may proceed to block 410 and otherwise proceed to block 412.

At block 410, the metadata index may be accessed. For example, metadata index manager 220 may traverse sequentially ordered (e.g. by timestamp or inverse timestamp) metadata index entries in reverse chronological order to identify data object identifiers corresponding to file location identifiers to support file data read and other operations.

At block 412, a new metadata index entry may be triggered. If the operation requires a new entry in the metadata index, method 400 may proceed to block 414 and otherwise proceed to block 418.

At block 414, an index entry may be generated. For example, metadata index manager 220 may generate an index entry from an object identifier and a file location identifier.

At block 416, the index entry may be added to the metadata index in sequential order. For example, metadata index manager 220 may add the index entry to the metadata index in a next available position on the data structure and/or based on a timestamp associated with operation that generated the new entry.

At block 418, a defragmentation operation may be triggered. If the operation requires a defragmentation operation to be executed using the metadata index, method 400 may proceed to block 420 and otherwise proceed to block 426.

At block 420, a plurality of index entries for a defragmentation interval may be defragmented. For example, the metadata index manager 220 may determine a plurality of index entries in defragmentation interval and combine the file blocks in the plurality of entries into a defragmented block.

At block 422, a defragmentation entry may be generated for the metadata index. For example, the metadata index manager 220 may generate a new entry with the file location identifier for the defragmented block and corresponding object identifier and add it to the metadata index in process similar to blocks 414 and 416.

At block 424, index entries may be removed from the metadata index. For example, the metadata index manager 220 may remove index entries that are no longer needed, including index entries obviated by the generation of the defragmented entry at block 422.

At block 426, a metadata index entry removal operation may be triggered. For example, metadata index manager 220 may initiate removal of index entries to support operations other than the defragmentation operation triggered at block 418. If the operation requires an entry to be removed, method 400 may proceed to block 424.

Figure 5:
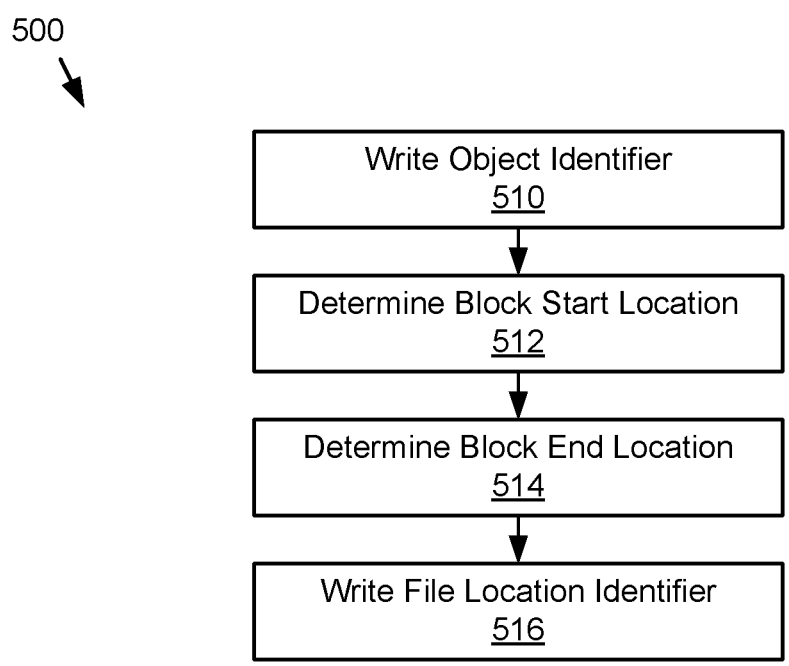
FIG. 5 is a flowchart of an example method for generating an entry in a metadata index.

FIG. 5 illustrates a flowchart of a method 500 for generating an entry in a metadata index. For example, storage application 150 may execute blocks 510-516 of method 500.

At block 510, an object identifier for the metadata index entry may be written. For example, the metadata index manager 220 may receive a GUID, timestamp, and/or other parameters for an object write operation from object storage interface 250 and use them to generate an object key value for the metadata index entry.

At block 512, a start location for the file data block may be determined. For example, the metadata index manager 220 may receive a file location identifier that includes a start location for the file data block from file system interface 240.

At block 514, an end location for the file data block may be determined. For example, the file location identifier received by the metadata index manager 220 may include an end location for the file data block and/or a block or interval length from which the end location may be determined.

At block 516, a file location identifier for the metadata index entry may be written. For example, the metadata index manager 220 may write the file location identifier including the block start location and the block end location in the metadata index entry associated with the object key value from block 510.

Figure 6:
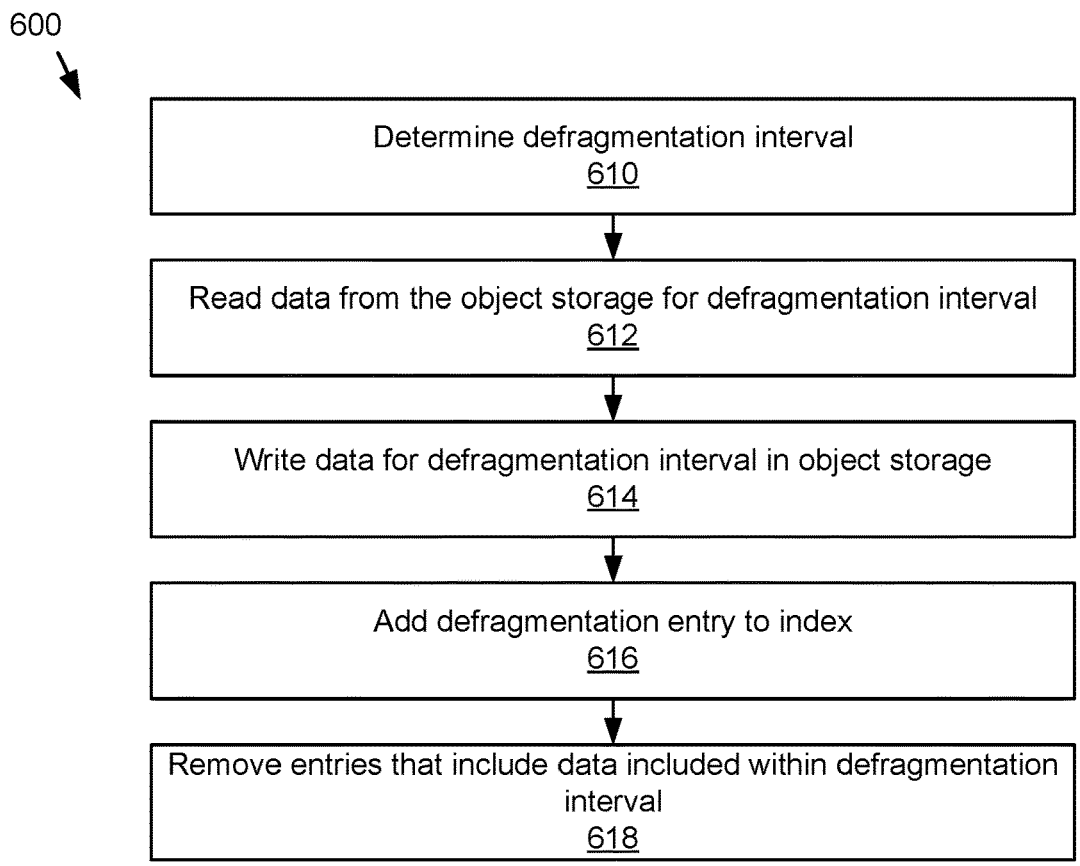
FIG. 6 is a flowchart of an example method for defragmenting a metadata index.

FIG. 6 illustrates a flowchart of a method 600 for defragmenting a metadata index. For example, storage application 150 may execute blocks 610-618 of method 600.

At block 610, a defragmentation interval may be determined. For example, metadata index manager 220 may determine the defragmentation interval which spans a first determined quantity of the plurality of entries including blocks each of a second determined size and forming a continuous interval, with or without overlapping data blocks.

At block 612, object data for the defragmentation interval may be read from the object storage system. For example, metadata index manager 220 may read the file data blocks for the defragmentation interval stored in the corresponding plurality of data objects in object storage 140.

At block 614, file data for the defragmentation interval may be written to the object storage system. For example, metadata index manager 220 may write the file data blocks for the defragmentation interval to object storage 140.

At block 616, a defragmentation entry may be added to the metadata index. For example, metadata index manager 220 may add a new entry to an end of the plurality of entries in the backend metadata index. The new entry may include a new file system interface location (i.e., interval of locations) identifier identifying a block spanning the defragmentation interval.

At block 618, prior metadata index entries that include data blocks included within the defragmentation interval may be removed. For example, metadata index manager 220 may remove entries of the plurality of prior entries that include a block of data included within the defragmentation interval.

Figure 7:
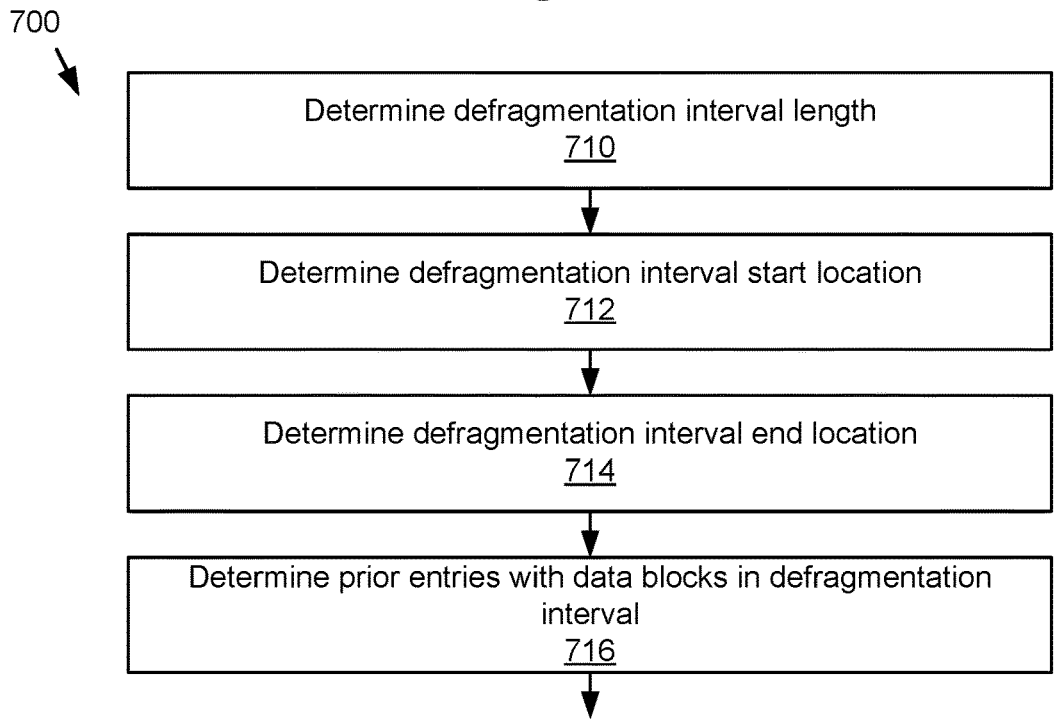
FIG. 7 is a flowchart of an example method for determining entries in a defragmentation interval.

FIG. 7 illustrates a flowchart of a method 700 for determining entries in a defragmentation interval. For example, storage application 150 may execute blocks 710-716 of method 700.

At block 710, a defragmentation interval length may be determined. For example, metadata index manager 220 may select a defragmentation interval length based on a preferred block size or block length for object storage 140 and/or adjust the defragmentation interval length to be at least the preferred block size while accommodating a desired interval of file data blocks or locations.

At block 712, a defragmentation interval start location may be determined. For example, metadata index manager 220 may determine a block start file location that is the earliest block in a continuous series of file locations or file data blocks for the start location of the resulting defragmented block.

At block 714, a defragmentation interval end location may be determined. For example, metadata index manager 220 may determine a block end file location that is the latest block in the continuous series of file locations or file data blocks starting from the start location and extending for the defragmentation interval.

At block 716, prior metadata index entries with file data blocks in the defragmentation interval may be determined. For example, metadata index manager 220 may determine each prior metadata index entry that includes a file location or file data block within the defragmentation interval and use that list of prior metadata index entries to insert the defragmentation entry and delete the prior metadata index entries.

Figure 8:
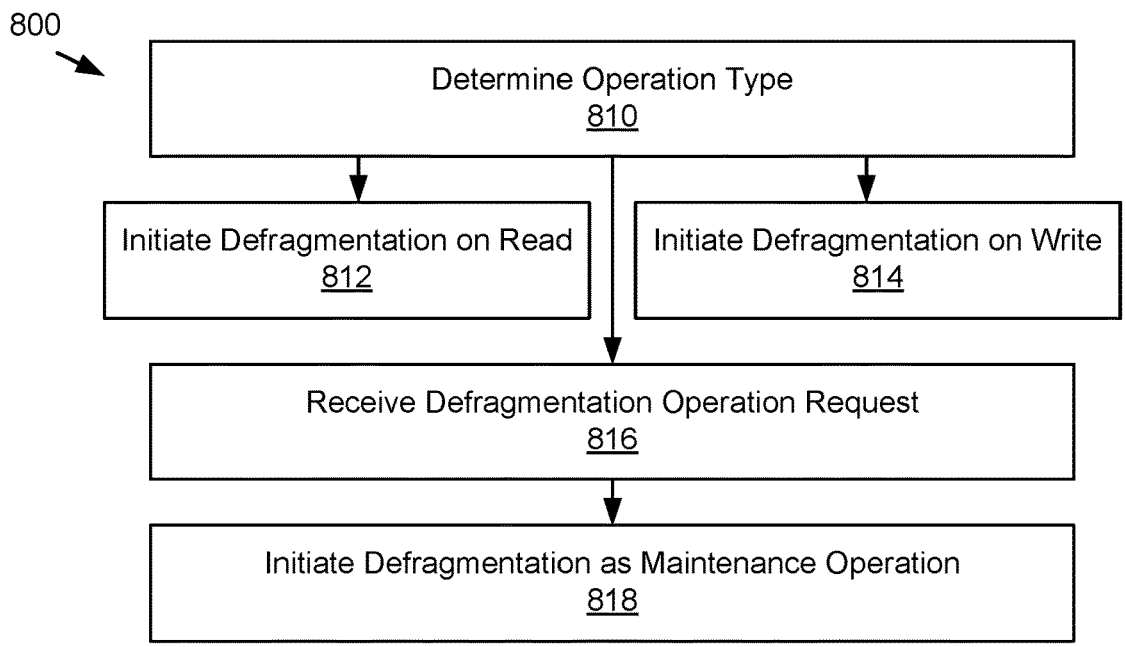
FIG. 8 is a flowchart of an example method for initiating a defragmentation operation.

FIG. 8 illustrates a flowchart of a method 800 for initiating a defragmentation operation. For example, storage application 150 may execute blocks 810-818 of method 800.

At block 810, an operation type may be determined. For example, metadata index manager 220 may determine an operation type for an operation handled by storage service 320 in order to selectively initiate a defragmentation operation.

At block 812, a read operation may be determined and defragmentation on a read operation may be initiated. For example, metadata index manager 220 may determine that a read operation is being processed by storage service 320, determine the read operation is a trigger condition for the defragmentation operation, and initiate the defragmentation operation using parameters from the read operation.

At block 814, a write operation may be determined and defragmentation on a write operation may be initiated. For example, metadata index manager 220 may determine that a write operation is being processed by storage service 320, determine the write operation is a trigger condition for the defragmentation operation, and initiate the defragmentation operation using parameters from the write operation.

At block 816, a defragmentation operation request may be received. For example, metadata index manager 220 may receive a defragmentation maintenance operation request for a background or foreground maintenance operation to defragment metadata index 260 or a portion thereof.

At block 818, the defragmentation operation may be initiated as a maintenance operation. For example, metadata index manager 220 may initiate the defragmentation operation independent of client file system data requests to perform defragmentation maintenance on metadata index 260 and/or object storage 140.

Figure 9:
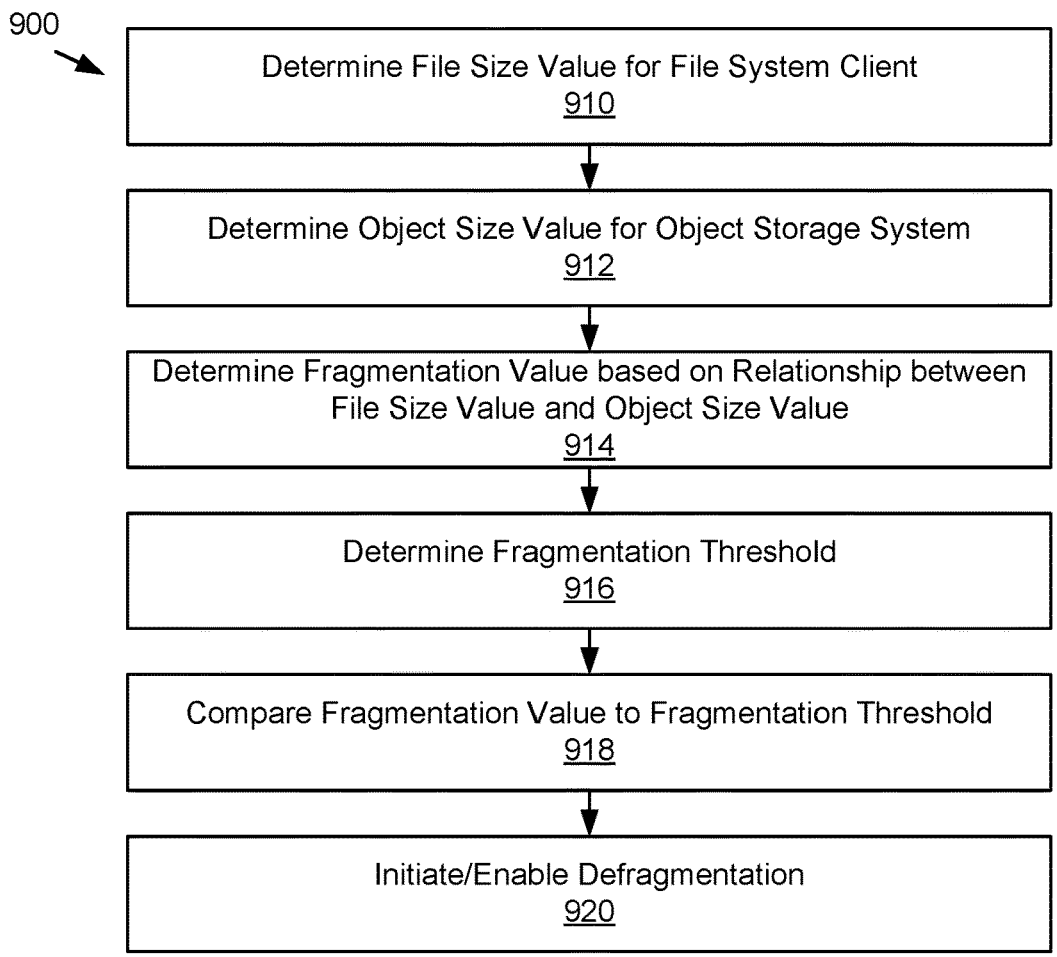
FIG. 9 is a flowchart of an example method for enabling defragmentation based on fragmentation values and fragmentation thresholds.

FIG. 9 illustrates a flowchart of a method 900 for enabling defragmentation based on fragmentation values and fragmentation thresholds. For example, storage application 150 may execute blocks 910-920 of method 900.

At block 910, a file size value may be determined for the file system client or clients. For example, metadata index manager 220 may receive a file size value from file system interface 240, such as a supported file block size (or block length), average file size, file size distribution, etc.

At block 912, an object size value may be determined for the object storage system. For example, metadata index manager 220 may receive an object size value from object storage interface 250, such as preferred object size.

At block 914, a fragmentation value based on a relationship between the file size value and the object size value may be determined. For example, metadata index manager 220 may calculate a ratio of the file size value to the object size value to determine the fragmentation value.

At block 916, a fragmentation threshold may be determined. For example, metadata index manager 220 may determine a fragmentation threshold value based on a performance impact value for metadata index 260 and/or object storage 140.

At block 918, the fragmentation value may be compared to the fragmentation threshold. For example, metadata index manager 220 may compare the fragmentation value to the fragmentation threshold value to determine whether the fragmentation threshold is met and metadata index 260 and/or object storage 140 has reached a fragmentation level that is significantly impacting system efficiency or performance.

At block 920, defragmentation operations may be initiated or enabled based on the fragmentation threshold being met. For example, metadata index manager 220 may initiate a defragmentation process or enable the process the be triggered by operational conditions in response to the fragmentation threshold being met at block 918.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of a hardware embodiment, a software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general-purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:
1. A system, comprising:
   a file system interface configured to process file data requests for data from a file system client;
   an object storage system interface configured to process object storage requests to an object storage system; and
   a metadata index manager configured to:
      manage a metadata index, wherein:
         the metadata index includes a plurality of entries;
         each entry of the plurality of entries includes:
            an object identifier for the object storage system; and
            a file system location identifier for a block of data; and
         the plurality of entries includes a plurality of continuous data blocks; and generate, responsive to a defragmentation operation, a defragmented entry in the metadata index, wherein the defragmented entry includes a defragmentation interval traversing the plurality of continuous data blocks.

2. The system of claim 1, further comprising:
a compactor configured to:
determine the defragmentation interval for a first determined quantity of the plurality of entries;
read blocks of data for the defragmentation interval from the object storage system; and
write a defragmented block of data for the defragmentation interval in the object storage system, wherein writing the block of data for the defragmentation interval generates the defragmented entry in the metadata index.

3. The system of claim 2, wherein:
the metadata index manager is further configured to:
add the plurality of entries in sequential order in the metadata index based on a timestamp associated with an operation associated with each entry;
access entries in the metadata index in reverse chronological order for new data operations; and
add the defragmented entry following the plurality of entries for the plurality of continuous data blocks.

4. The system of claim 2, wherein:
the file system location identifier for each entry of the plurality of entries defines:
a block start location;
a block end location; and
a block length for an interval of the block of data; and
a new file system location identifier for the defragmented entry:
identifies the defragmented block of data spanning the defragmentation interval;
defines a defragmented block start location equal to an earliest block start location among the plurality of continuous data blocks; and
defines a defragmented block end location equal to a latest block end location among the plurality of continuous data blocks.

5. The system of claim 2, wherein:
the compactor is further configured to:
remove entries in the plurality of entries preceding the defragmented entry that include a block of data within the defragmentation interval.

6. The system of claim 2, further comprising:
a defragmentation initiator configured to:
determine an operation type for a storage operation; and
initiate, responsive to the operation type being a write operation, the defragmentation operation, wherein the compactor includes a write block for the write operation in the defragmentation interval.

7. The system of claim 2, further comprising:
a defragmentation initiator configured to:
determine an operation type for a storage operation; and
initiate, responsive to the operation type being a read operation, the defragmentation operation, wherein the compactor includes a read interval for the read operation in the defragmentation interval.

8. The system of claim 7, wherein the read interval is the defragmentation interval.

9. The system of claim 1, further comprising:
a defragmentation initiator configured to:
determine a fragmentation value for the metadata index based on a relationship between:
a file size value for the file system client; and
an object size value for the object storage system;
determine a fragmentation threshold based on a performance impact value for the object storage system; and
initiate, responsive to the fragmentation value meeting the fragmentation threshold, the defragmentation operation.

10. The system of claim 1, further comprising:
a defragmentation initiator configured to:
receive a maintenance operation request for the defragmentation operation; and
initiate, responsive to receiving the maintenance operation request, the defragmentation operation.

11. A computer-implemented method, comprising:
processing, through a file system interface, file data requests for data from a file system client;
processing, through an object storage system interface, object storage requests to an object storage system;
managing a metadata index, wherein:
the metadata index includes a plurality of entries;
each entry of the plurality of entries includes:
an object identifier for the object storage system; and
a file system location identifier for a block of data; and
the plurality of entries includes a plurality of continuous data blocks with continuous intervals; and
generating, responsive to a defragmentation operation, a defragmented entry in the metadata index, wherein the defragmented entry includes a defragmentation interval traversing the plurality of continuous data blocks.

12. The computer-implemented method of claim 11, further comprising:
determining the defragmentation interval for a first determined quantity of the plurality of entries;
reading blocks of data for the defragmentation interval from the object storage system; and
writing a defragmented block of data for the defragmentation interval in the object storage system, wherein writing the defragmented block of data for the defragmentation interval generates the defragmented entry in the metadata index.

13. The computer-implemented method of claim 12, wherein the managing the metadata index comprises:
adding the plurality of entries in sequential order in the metadata index based on a timestamp associated with an operation associated with each entry;
accessing entries in the metadata index in reverse chronological order for new data operations; and
adding the defragmented entry following the plurality of entries for the plurality of continuous data blocks.

14. The computer-implemented method of claim 12, wherein:
the file system location identifier for each entry of the plurality of entries defines:
a block start location;
a block end location; and
a block length for an interval of the block of data; and
a new file system location identifier for the defragmented entry:
identifies the defragmented block of data spanning the defragmentation interval;
defines a defragmented block start location equal to an earliest block start location among the plurality of continuous data blocks; and defines a defragmented block end location equal to a latest block end location among the plurality of continuous data blocks.

15. The computer-implemented method of claim 12, further comprising:
removing entries in the plurality of entries preceding the defragmented entry that include a block of data within the defragmentation interval.

16. The computer-implemented method of claim 12, further comprising:
determining an operation type for a storage operation; and
initiating, responsive to the operation type being a write operation, the defragmentation operation, wherein a write block for the write operation is in the defragmentation interval.

17. The computer-implemented method of claim 12, further comprising:
determining an operation type for a storage operation; and
initiating, responsive to the operation type being a read operation, the defragmentation operation, wherein a read interval for the read operation is in the defragmentation interval.

18. The computer-implemented method of claim 11, further comprising:
determining a fragmentation value for the metadata index based on a relationship between:
a file size value for the file system client; and
an object size value for the object storage system;
determining a fragmentation threshold based on a performance impact value for the object storage system; and
initiating, responsive to the fragmentation value meeting the fragmentation threshold, the defragmentation operation.

19. The computer-implemented method of claim 11, further comprising:
receiving a maintenance operation request for the defragmentation operation; and
initiating, responsive to receiving the maintenance operation request, the defragmentation operation.

20. A system, comprising:
means for processing, through a file system interface, file data requests for data from a file system client;
means for processing, through an object storage system interface, object storage requests to an object storage system;
means for managing a metadata index, wherein:
the metadata index includes a plurality of entries;
each entry of the plurality of entries includes:
an object identifier for the object storage system; and
a file system interface location identifier for a block of data; and
the plurality of entries includes a plurality of continuous data blocks with continuous intervals; and
means for generating, responsive to a defragmentation operation, a defragmented entry in the metadata index, wherein the defragmented entry includes a defragmentation interval traversing the plurality of continuous data blocks.

* * * * *